United States Patent [19]
Veith

[11] Patent Number: 5,183,874
[45] Date of Patent: Feb. 2, 1993

[54] POLYORGANOSILOXANE-POLYAMIDE BLOCK COPOLYMERS

[75] Inventor: Cary A. Veith, Arlington, Va.

[73] Assignee: Technical Development Associates, Copley, Ohio

[21] Appl. No.: 599,475

[22] Filed: Oct. 18, 1990

[51] Int. Cl.$^5$ .............................................. C08G 77/06
[52] U.S. Cl. ...................................... 528/16; 525/474
[58] Field of Search ........................... 528/16; 525/474

[56] References Cited

U.S. PATENT DOCUMENTS 3,772,253  11/1973  Brassat ................................. 528/15
4,031,164  6/1977  Hedrick et al. .............. 260/857 PG

OTHER PUBLICATIONS

Owen and Thompson, Br. Poly: J. 4, pp. 297–303 (1972).
Reagents for Organic Synthesis, Fieser and Fieser, pp. 620, 625 (1967).
Policastro et al., "Synthesis of New Polydimethylsiloxane-ε-caprolactam Block Copolymers", Polymer Bulletin 16, 1986, pp. 43–45.
Owen et al., "Siloxane Modification of Polyamides", Br. Polymer J. 4, 1972, pp. 297–303.
Lefebvre et al., "Polysiloxane-based Activators in the Anionic Block Copolymerization of ε-Caprolactam", Makromol. Chem. 183, 1982, pp. 2453–2457.
Wichterle, "On Caprolactam Polymerization", Makromol. Chem. 35, 1960, pp. 174–182.

Primary Examiner—Melvyn I. Marquis
Assistant Examiner—David E. Aylward

[57] ABSTRACT

A class of catalysts for the anionic copolymerization of cyclic lactams in the presence of ω-(N-acyllactam)-polyorganosiloxanes, α,ω-di-(N-acyllactam)polyorganosiloxanes or star-shaped ω-(N-acyllactam)polyorganosiloxanes is disclosed. The catalysts successfully protect the siloxane prepolymer from harmful depolymerization reactions at elevated temperatures while anionically polymerizing the cyclic lactams via ringopening. Diblock, triblock, multiblock and star-block copolymers, e.g., of a polyorganosiloxane and a polyamide, with advantageously high polyorganosiloxane and polyamide block molecular weights and superior heat resistance can be synthesized with the catalysts. The composition of these block copolymers, with the structure AB, ABA, and star-(BA)$_r$, $r \geq 3$, where A=polyamide and B=polyorganosiloxane, and the process for producing them are also described.

11 Claims, 3 Drawing Sheets

POLYORGANOSILOXANE-POLYAMIDE BLOCK COPOLYMERS

BACKGROUND OF THE INVENTION

This invention was made with Government support under DMR-87-19217 awarded by the National Science Foundation. The Government has certain rights in this invention.

This invention was made with Government support under contract number N00014-87-K-0517, R&T code 4132001-02 awarded by the Office of Naval Research. The Government has certain rights in this invention.

This invention is related to diblock, triblock, higher multiblock and star-block copolymers of a polyorganosiloxane and a polyamide and the reagents and methods used to prepare them. Diblock copolymers have two chemically different polymers covalently bonded to each other at one end of their chains. Triblock copolymers have a central polymeric block covalently bonded at its two chain ends to two different polymeric blocks (which may be the same or different chemically). Higher multiblock copolymers consist of multiple polymer blocks of chemically different repeat units covalently bonded to each other through their chain end(s). And star-block copolymers are comprised of a central plurifunctional core with three or more radial arms where each arm can represent a diblock, triblock or multiblock copolymer. For this invention, the polyorganosiloxane may have alkyl, aryl, alkenyl or a combination of these substituents on silicon and examples include polydimethylsiloxane, polydiethylsiloxane, polymethylphenylsiloxane and polydimethyl-comethylvinylsiloxane. The polyamide may be selected from polyamide-4, polyamide-5, polyamide-6, up to polyamide-14, or any combination of these, with polyamide-6 being preferred.

Polyorganosiloxane-polyamide block copolymers may be prepared by the use of functionalized polyorganosiloxanes commonly called macroinitiators. For the anionic copolymerization with cyclic lactams, polyorganosiloxane macroinitiators are comprised of N-acyllactam groups at the end(s) of the polyorganosiloxane chain which are used to initiate lactam ring opening to yield the polyamide-n blocks, where n=3, 4, 5, ... 14.

Previous attempts at preparation of polydimethylsiloxane-polyamide-6 block copolymers via the macroinitiator method (M. J. Owen, et. al., Br. Polym. Jnl., 4, 297 (1972); P. M. Lefebvre, et. al., Makromol. Chem., 183, 2453 (1982); P. P. Policastro, et. al., Polym. Bull., 16, 43 (1986)) have resulted in copolymers with very low block molecular weights. These low molecular weight copolymers are unsuitable for impact modification, fibers and other toughening applications because of poor mechanical properties such as lower tensile, shear and yield strengths as well as the inability to emulsify blends with homopolyorganosiloxane and/or homopolyamide. In order for a block (or graft) copolymer to emulsify a blend of the two respective homopolymers, the block molecular weights must be greater than the molecular weight of the respective homopolymers; otherwise, phase separation (separate aggregation of the homopolymer(s) and copolymer) occurs and the material properties are not sufficiently enhanced.

For the previously prepared polydimethylsiloxane-polyamide-6 block copolymers, short polyamide-6 blocks resulted from: 1) a very high concentration of macroinitiators during copolymerization such that the ε-caprolactam was distributed among many competing dimethylsiloxane blocks; or 2) from copolymerization of the ε-caprolactam at low temperatures (about 75°–130° C.). At these temperatures, the solubility of polyamide-6 in ε-caprolactam is quite low so that the polymer precipitates from its monomer at very low conversion; only oligomeric (degree of polymerization, $\overline{D}_p=10$ or so) polyamide-6 is formed at temperatures of 75° C. (O. Wichterle, Makromol. Chem., 35, 174 (1960)).

With the aforementioned polydimethylsiloxane-polyamide-6 block copolymers, short siloxane blocks resulted from the substantial depolymerization of the polydimethylsiloxane at temperatures as low as 110° C. in the presence of conventional lithium and sodium caprolactam catalysts (P. M. Lefebvre, et.al., supra.). After 2 hours exposure of unfunctionalized polydimethylsiloxane in excess ε-caprolactam to lithium and sodium caprolactam separately at 110° C., the polydimethylsiloxane molecular weight decreased by approximately 25% and 45%, respectively. During actual copolymerizations, the polydimethylsiloxane depolymerization is even greater and low diblock copolymer yields of only 8–10% were achieved using these catalysts at a temperature of 110° C. (P. M. Lefebvre, et.al., supra.).

Other catalysts such as LiAlH$_4$ were used (M. J. Owen, et.al., supra.) in copolymerizations of ω-N-(acyllactam)polydimethylsiloxane and ε-caprolactam or lauryllactam in toluene at 110° C., but gave copolymers with very low molecular weight polyamide blocks. Although LiAlH$_4$ causes only moderate rearrangement of the polydimethylsiloxane at 110° C. in toluene and is less destructive than other catalysts, e.g. alkali metal caprolactams, the resulting low molecular weight copolymers were unsuitable for toughening applications.

From previous work, it is apparent that copolymerization temperatures of about 110° C. produce copolymers with low molecular weight polyamide blocks. At higher temperatures (greater than about 150° C.), where high molecular weight polyamides must be synthesized, the polyorganosiloxane depolymerization from the commonly used alkali metal lactams or LiAlH$_4$ catalysts is much more substantial and copolymer yields are even poorer. At higher temperatures, the alkali metal lactam and LiAlH$_4$ catalysts chemically alter the structure of the polydimethylsiloxane decreasing its molecular weight, increasing its polydispersity and creating cyclic dimethylsiloxanes from an intially linear polydimethylsiloxane. Quite simply, all of the conventional catalysts comprised of LiAlH$_4$ and metal lactams (see R. M. Hedrick and J. M. Gabbert, U.S. Pat. No. 4,031,164, Jun. 21, 1977; assigned to Monsanto Co., St. Louis, Mo.) for the ring opening polymerization of cyclic lactams in the presence of polyorganosiloxane macroinitiators at elevated temperatures are simply too destructive towards the polyorganosiloxanes for the successful production of high molecular weight copolymers.

SUMMARY OF THE INVENTION

Polyorganosiloxanes possess many very attractive physical properties such as high molecular flexibility (low $T_g$), high temperature stability, low surface tension, high oxygen permeability, low refractive indices, stable dielectric properties and low thrombogenicity and hence good bio-compatibility. Their advantages properties make the polyorganosiloxanes attractive in space research, optoelectronics, microelectronic photolithography, biomaterials, extreme (high and low) temperature elastomer applications, etc. The polyorganosiloxanes are well suited to anionic, ring-opening polymerization which facilitates end functionalization and their use in block copolymer applications. It is the ease and flexibility of their synthesis, their superior thermal stability and very low glass transition temperatures as compared to other rubbery polymers such as polydienes, polyethers or polyalkylmethacrylates that make the polyorganosiloxanes attractive in impact modifications with polyamides.

Polyamides comprise a large class of semicrystalline thermoplastic polymers that have high glass transition temperatures (when dry), high moduli and tensile strengths, low permeabilities (good barrier materials), excellent solvent resistance and strong affinity for moisture. Polyamides may be prepared by condensation (e.g. nylon-6,6) or ring-opening (e.g. nylon-6) reactions. The latter class includes polymerization of cyclic lactams, pyrrolidones and piperidones and is preferred for the preparation of well-defined di-, tri-, multi- and star-block copolymers by utilizing macroinitiators.

Through the use of polyorganosiloxane macroinitiators, flexible siloxane polymers can be covalently and controllably coupled to polyamides to yield block copolymers with well definded molecular structure and hence morphology. These polyorganosiloxane-polyamide block copolymers can then effectively be used as emulsifying agents (or surfactants) with both homopolyorganosiloxanes and homopolyamides producing thermodynamically stable ternary blends with improved properties over an exceptionally wide temperature range (ca. −100° to 180° C.). Improvement in toughness, i.e. the energy required to deform a material, and thermal stability during melt processing (at ca. 250° C.) have been the goals of the preparation of the polyorganosiloxane-polyamide block copolymers described herein although other uses in thermoplastic elastomers, fibers, permeation and barrier materials, biomedicine, etc. are possible.

An object of the invention is to overcome the disadvantages of the prior art, including the substantial depolymerization and cyclization of the polyorganosiloxane during growth of the polyamide block at elevated temperatures, and to achieve the successful anionic block copolymerization of polyamide and polyorganosiloxane. Another object of the invention is to produce polyorganosiloxane-polyamide di-, tri-, multi- and star-block copolymers in good yields and with high block molecular weights for use as emulsifying agents with good mechanical properties. Preferably, the polyorganosiloxane block [B] has a number average molecular weight of about 10 kg/mole to about 150 kg/mole and the polyamide block [A] has a number average molecular weight of at least about 15 to 20 kg/mole to about 130 kg/mole.

The invention pertains to a class of catalysts which permit successful preparation of di-, tri-, multi- and star-block copolymers of polyamide and polyorganosiloxane at elevated temperatures to achieve high polyamide and polyorganosiloxane block molecular weights. The family of catalysts includes mono-, di-, or tri-alkoxy or mono-, di- or tri-aryloxy substituted lithiumaluminumhydrides that protect the polyorganosiloxane from substantial depolymerization at elevated temperatures yet simultaneously allow the ring-opening of the cyclic lactam to proceed. This facilitates production of high molecular weight polyamide blocks with intact polyorganosiloxane or copolyorganosiloxane blocks.

The invention encompasses the composition of polyorganosiloxane-polyamide di-, tri-, multi- and star-block copolymers of advantageously high polyamide and polyorganosiloxane block molecular weights. In accordance with the invention, structurally simple high molecular weight di-, tri-, multi- and star-block polyorganosiloxane-polyamide copolymers are now available, for use as, e.g., emulsifying agents in impact polyamides, modified permselective polyamides, siloxane-modified polyamides for thermoplastic elastomers, fibers, biomaterials, etc.

The invention also involves the process by which the catalyst of this invention, functionalized polyorganosiloxane and cyclic lactam monomer(s) are reacted to produce the high molecular weight di-, tri-, multi- and star-block polyorganosiloxane-polyamide block copolymers.

DETAILED DESCRIPTION OF THE INVENTION AND PREFERRED EMBODIMENTS

Preparation of the Polyorganosiloxane Macroinitiator

Figure 1:
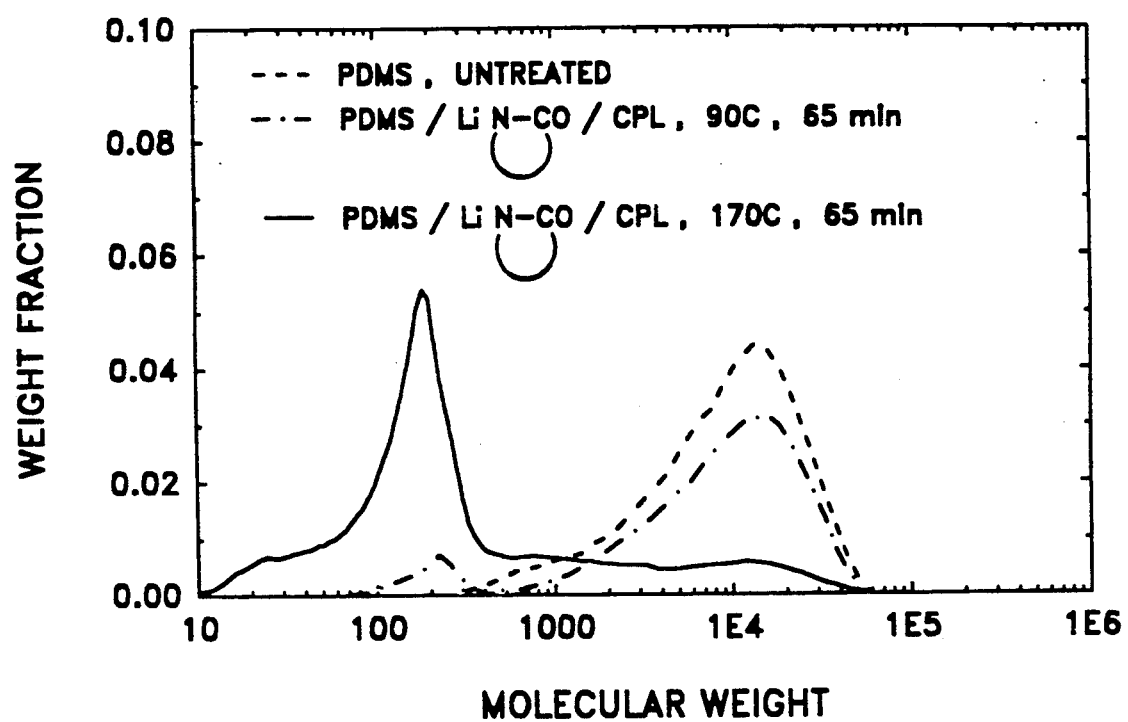
FIG. 1 shows the size exclusion chromatograms of unfunctionalized polydimethylsiloxane before and after 65 minutes exposure in ε-caprolactam to lithium caprolactam at 90° C. and 170° C.

The polyorganosiloxane macroinitiator is produced by the anionic ring opening polymerization of one or more cycloorganosiloxanes of the formula:

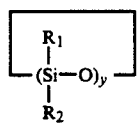

where y=3 or 4 and R$_1$, R$_2$ can be the same or different and independently chosen from alkyl with 1 to 18 carbon atoms, aryl, alkenyl with 1 to 12 carbon atoms and combinations thereof. The cyclotrisiloxanes (y=3) are preferred over the cyclotetrasiloxanes (y=4) for anionic ring opening polymerizations, e.g., preferred monomers include hexamethylcyclotrisiloxane, hexaethylcyclotrisiloxane, trimethyltriphenylcyclotrisiloxane and hexaphenylcyclotrisiloxane. However, the cyclotetrasiloxanes such as octamethylcyclotetrasiloxane or tetramethyltetraphenylcyclotetrasiloxane can also be used.

Cycloorganosiloxanes containing unsaturation commonly in the form of vinyl or allyl substituents on silicon, may be homopolymerized or copolymerized with the alkyl and aryl substituted cycloorganosiloxanes to incorporate alkenyl moieties into the polyorganosiloxane for post-polymerization vulcanization or other reaction. Tetramethyltetravinylcyclotetrasiloxane may be used for this purpose. Thus, depending on the type of initiator and number of monomers used, the resulting polyorganosiloxane can be 1) a linear or star homopolyorganosiloxane with any combination of alkyl, aryl and alkenyl substituents on silicon, 2) a linear or star-shaped block copolyorganosiloxane with two or more monomers possessing any combination of alkyl, aryl and alkenyl substituents on silicon and a definite order of the blocks or 3) a linear or star-shaped copolyorganosiloxane with two or more monomers possessing any combination of alkyl, aryl and alkenyl substituents on silicon with a random alternation of the blocks. The linear polyorganosiloxane or one of the arms of the star-polyorganosiloxane has the following general formula:

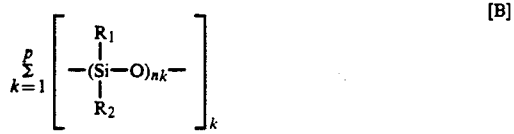
[B]

where k is a counter or summation index variable, $n_k$ represents the number average degree of polymerization of each block and can range from about 3 to 7000, and p is a factor that indicates the blockiness of the copolyorganosiloxane; for p=1 a pure homopolyorganosiloxane is produced, for p=2 a diblock copolyorganosiloxane is produced, for p=3 a triblock copolyorganosiloxane is produced and for p>>1 the copolyorganosiloxane approaches a more random block copolymer. The $R_1$, $R_2$ substituents are defined as before. The summation serves to indicate that multiple organosiloxane blocks each with number average degree of polymerization, $n_k$, with substituents $R_1$ and $R_2$, may be covalently incorporated sequentially into the backbone to produce the copolyorganosiloxane as shown below:

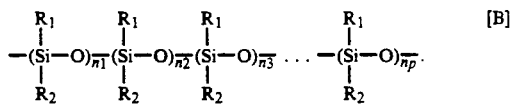
[B]

Note that $n_k$, $R_1$ and $R_2$ may vary from block to block as k varies from 1 to its final value, p, to represent the various blocks of monomer units with substituents on silicon of alkyl, aryl, alkenyl and combinations thereof.

The relative amounts of the various monomer units with the alkyl, aryl and alkenyl groups can significantly affect the properties of the polyorganosiloxane or copolyorganosiloxane. For example, addition of more aryl siloxy monomer units in lieu of alkyl siloxy monomer units (such as substituting diphenylsiloxy for dimethylsiloxy) increases the thermal stability, service temperature and the refractive index of the polyorganosiloxane but also decreases the molecular flexibility of the main chain (by raising the internal barriers to bond rotation). Thus, depending on the desired final material properties, the thermal resistance can be improved, the refractive index can be made to approach that of amorphous silica for clear, index-matched materials and with high enough diphenylsiloxy content, the polyorganosiloxane may become a solid. As another example, addition of alkenyl unsaturation into the polyorganosiloxane facilitates post-polymerization vulcanization which can be accomplished by several different methods such as free radical reactions with or without additional components such as styrene or divinylbenzene, high energy electromagnetic radiation (e.g. X-rays) or by hydrosilylation with various silanes and platinum catalysts. These reactions can be used to alter mechanical properties of the polyorganosiloxane increasing its viscoelasticity and shear modulus for example or to impart other functionalities to the main chain.

Process

The siloxane ring-opening polymerization is performed in concentrated tetrahydrofuran solution or in bulk at temperatures from 25° to 65° C. The tetrahydrofuran is purified by distillation from $LiAlH_4$ and the cycloorganosiloxanes are commonly distilled from $CaH_2$. The cycloorganosiloxane comonomer(s) containing the alkenyl group(s) is added after initiation of the dialkylcyclosiloxane, alkylarylcyclosiloxane or diarylcyclosiloxane comonomers when alkyl lithium compounds (e.g. n-butyllithium) are used. If lithium silanolates (e.g. $Li^+$$^-OSi(CH_3)_3$ or $Li^+$$^-OSi(\phi)_2O^-Li^+$ where $\phi$=phenyl) are used as the initiating specie, then the cycloorganosiloxane(s) containing the alkenyl group(s) can be present in the starting monomer mixture.

To achieve a regular block structure in the copolyorganosiloxane, the cycloorganosiloxane comonomers can be added sequentially. For example, after initiation by an alkyl lithium (e.g. n-butyllithium), consumption of 98–100% of the first comonomer, e.g., hexamethylcyclotrisiloxane, could be followed by addition of a second comonomer, e.g., tetramethyltetravinylcyclotetrasiloxane, to create a diblock copolyorganosiloxane with a dimethylsiloxane block sequentially coupled to a methylvinylsiloxane block. Extension of sequential addition with more than two comonomers will be apparent to the artisan.

After suitable propagation time to achieve maximum polyorganosiloxane concentration (which is dependent on the type of monomer(s), concentration and temperature), the polymerization is terminated by the addition of an N-(chlorosilylalkylenoyl)lactam compound of the general formula:

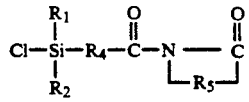

where $R_1$, $R_2$ may be alkyl, aryl, alkenyl or combination thereof as defined before but alkyl with 1 or 2 carbon atoms is preferred for reduced steric hindrance, $R_4$ is an alkylene with at least two carbon atoms, but preferably a minimum of three carbon atoms, arylene or a combination of alkylene and arylene, and $R_5$ is an alkylene and can vary from 3 to 13 C atoms with a preferred range of 3 to 5 for greater reactivity.

For monofunctional initiators, condensation of the living lithium polyorganosiloxanolate with the chlorosilyl group of the N-(chlorosilylalkylenoyl)lactam functionalizes the terminus of the polyorganosiloxane with a $\omega$-N-acyllactam moiety. The $\omega$-(N-acyllactam)polyorganosiloxane has the general formula:

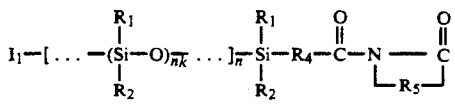

where k=1, 2, ... p and signifies that the organosiloxane block within the brackets repeats with different substituents and degree of polymerization, $n_k$, a total of p times depending on the structure of the polyorganosiloxane to yield a polyorganosiloxane block with an overall number average degree of polymerization of n where $n = n_1 + n_2 + n_3 + \ldots + n_p$; the summation notation has been dropped for convenience. $I_1$ represents the monofunctional initiating group (e.g. n—$C_4H_9$—, $Si(CH_3)_3O$—, $C_6H_5$—) and the $R_m$ (m=1, 2, 4, 5) are as defined before.

If an $\alpha,\omega$-di-(N-acyllactam)polyorganosiloxane is desired (as for ABA triblock copolymers), then a difunctional initiator such as diphenyldilithiodisilanolate is employed and two moles of N-(chlorosilylalkylenoyl)lactam are required per mole of polyorganosiloxane chains. The $\alpha,\omega$-di-(N-acyllactam)polyorganosiloxane appears as:

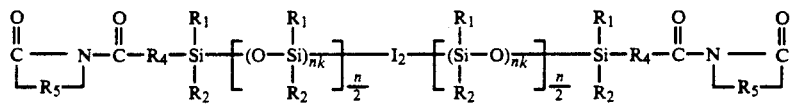

with nomenclature as above except that $I_2$ equals a difunctional initiating group (e.g. —O—$Si(R_1)_2$—O—), the polyorganosiloxane block number average degree of polymerization is n/2 in each direction along the chain because of the difunctional initiator and the ... within the brackets, which indicates the possibility of multiple organosiloxane blocks, has been dropped. As before, $R_1$, $R_2$ may vary from block to block within the main chain of the macroinitiator depending on the number, type and method of addition of the cycloorganosiloxane monomers.

If a star-shaped polyorganosiloxane is desired, then a plurifunctional anionic initiator, such as micro-particles of p-divinylbenzene prereacted with an lithium alkyl initiator (e.g. n-butyllithium), is used to initiate ring opening of the desired cycloorganosiloxane and subsequent propagation of the living organosiloxanolate grows the arms of the star polyorganosiloxane via a "core first" method; (see W. Burchard, et.al., Polymer, 16, 180 (1975) for preparation of the micro-particles from p-divinylbenzene and n-butyllithium). After the cycloorganosiloxane is consumed, the N-(chlorosilylalkylenoyl)lactam is introduced to terminate each arm of the star polyorganosiloxane with an $\omega$-N-acyllactam moiety thereby creating a star-shaped polyorganosiloxane macroinitiator. The moles of the N-(chlorosilylalkylenoyl)lactam should be slightly greater than the moles of anionic sites on the micro-particles, which is determined by stoichiometry during preparation of the polyanionic initiator and by titration, to ensure that all arms of the star polyorganosiloxane are functionalized. Each arm of the star $\omega$-(N-acyllactam)-polyorganosiloxane has the same formula as that for the monofunctional, linear, $\omega$-(N-acyllactam)polyorganosiloxane shown above except that the initiator moiety would now represent one site of the polyanionic initiator.

The macroinitiator is worked up by filtration and precipitation using methanol/toluene and appears as a slightly yellow liquid to viscous gum depending on the molecular weight. The number average molecular weight of the polyorganosiloxane macroinitiator can range from about 2 kg/mole to 300 kg/mole depending on the desired siloxane content in the copolymer. For the case of star-macroinitiators, individual arm number average molecular weights for the polyorganosiloxane block can range from about 1 kg/mole to 100 kg/mole such that the aggregate star molecule can have 3 to 400,000 arms depending on the functionality of the polyanionic initiator.

Copolymerization of Cyclic Lactams with a Polyorganosiloxane Macroinitiator

The comonomer(s) for formation of the polyamide block is a cyclic lactam of the general formula:

where $R_6$ is an alkylene group with from 3 to 13 carbon atoms. The preferred monomer is $\epsilon$-caprolactam (with 5 C atoms), although other comonomers may include valerolactam, capryllactam and lauryllactam as well as 2-pyrrolidone and 2-piperidone. Also included within the scope of the invention is other cyclic lactams with substituents on the alkylene group that do not inhibit or adversely affect the ring opening reaction, e.g., 5-methyl-2-pyrrolidone.

Introduction of the N-acyllactam initiator at the end(s) of the polyorganosiloxane is necessary to initiate the lactam ring opening reaction at temperatures below about 200° to 210° C. and ensures that the polyamide block [A] is covalently attached to the polyorganosiloxane block [B]. During copolymerization, the cyclic lactam ring is opened to give the polyamide block as shown below:

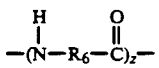  [A]

where z ranges from about 15 to 1200. A polyorganosiloxane-polyamide diblock copolymer with only one cycloorganosiloxane monomer and one cyclic lactam monomer, has the formula:

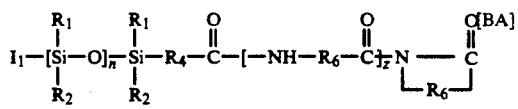

where n is the number average degree of polymerization of the homopolyorganosiloxane block and can vary from about 3 to 7000 and z is the number average degree of polymerization of the homopolyamide block and can vary from about 15 to 1200. All the substituent nomenclature ($R_m$, m=1, 2, 4, 6) and $I_1$ is as previously defined. This structure presumes no additional primary amine (such as aniline), secondary amine or primary or secondary amide is added to end cap the polyamide block. If these groups are added, the above structure differs only in the group at the terminus of the polyamide block.

For polyamide-polyorganosiloxane-polyamide (ABA) triblock copolymers, polyamide block growth occurs in both chain directions simultaneously and the following structure is produced assuming an α,ω-di-(N-acyllactam)polyorganosiloxane homopolymer was used as the macroinitiator:

For an ω-(N-acyllactam)copolyorganosiloxane macroinitiator and one cyclic lactam monomer, the resulting polyorganosiloxane-polyamide block copolymer has the formula:

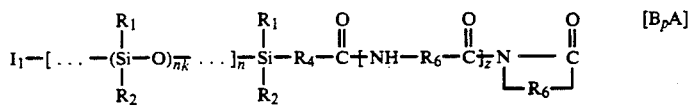

[B$_p$A]

Thus, for a copolyorganosiloxane macroinitiator with two different cycloorganosiloxane monomers, the resulting copolyorganosiloxane-polyamide copolymer is actually a terpolymer consisting of a homopolyamide block and two different organosiloxy repeat units, the

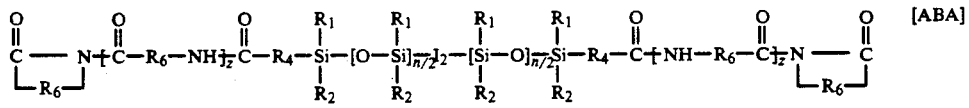

[ABA]

again with n/2 signifying that, on average, one-half of the total monomer units per chain are added in each growth direction and all other nomenclature is as previously defined. As before, depending on the addition of any monofunctional amines or amides, the triblock termini will be modified.

However, within the scope of this invention, the polyorganosiloxane and polyamide blocks may contain multiple monomers. Preparation of copolyorganosiloxane blocks was detailed in the previous section. Copolyamide blocks can be prepared by simply charging the copolymerization reactor with two or more different cyclic lactams, pyrrolidones or piperidones and then adding the catalyst. Depending on the reactivities of the different lactam anions to the acyllactams and the different equilibria of dissociated metalated lactams to contact metal lactams, random or block-like copolyamide blocks may be produced. Thus, for nearly equivalent reactivities of two different lactam monomers, a random ordering of the lactam monomers within the polylactam will occur. However, if one of the cyclic lactams is much more reactive, then that lactam preferentially will be added initially to the growing polyamide block enriching the polyamide with that monomer and creating a block-like structure. The tail of that growing polyamide block will necessarily be enriched in the lactam with the lowest reactivity creating another block-like region within the same polymer chain.

The copolymerization of two or more cyclic lactams may prove beneficial in certain applications where decreased moisture absorption is desired and so a significant fraction of the polyamide block may contain more nylon-12 which has significantly less moisture sensitivity than nylon-6 or nylon-4 for example. This lactam copolymerization approach may also be used to introduce various lactam monomers to disrupt the regular periodicity of hydrogen bonding sites along the backbone thus lowering the crystallinity of the resulting polyamide block for certain mechanical applications.

latter two possibly arranged from a simple diblock structure all the way to a random alternating block copolymer. If the copolyorganosiloxane macroinitiator is a terpolymer consisting of three different cycloorganosiloxane monomers, then the resulting copolyorganosiloxane-polyamide block copolymer would contain a total of four different monomeric repeat units; the three siloxy repeat units could be arranged from a triblock to a random block structure which is covalently connected to the homopolyamide block. Additional extensions with more cycloorganosiloxane monomers will be apparent to the artisan.

If an α,ω-difunctionalcopolyorganosiloxane and one cyclic lactam monomer was used, then the copolyorganosiloxane-polyamide "triblock" copolymer would have the following structure with the previous nomenclature (except that the ••• have been omitted within the polyorganosiloxane block [B]):

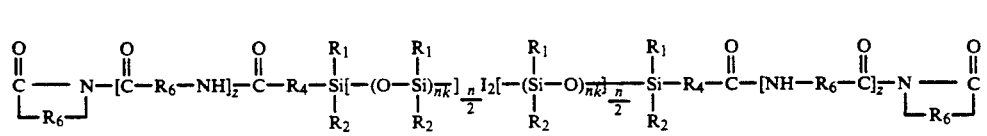

[AB$_p$A]

As before, the copolyorganosiloxane block can be arranged from a simple triblock structure all the way to a random alternation of the blocks such that each n$_k$ varies from about 3 to 7000 and that the overall central polyorganosiloxane block has a number average degree of polymerization of n which varies from about 3 to 7000.

Copolyorganosiloxane macroinitiators can also be copolymerized with multiple cyclic lactam monomers giving rise to copolyorganosiloxanecopolyamide block copolymers. For an ω-(N-acyllactam)copolyorganosiloxane copolymerized with l different cyclic lactams, the structure appears as:

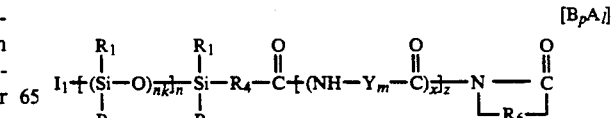

[B$_p$A$_l$]

where m is an integer and m=1, 2, . . . l, to represent the l different lactam monomers incorporated into the polyamide block in a random or block-like order, $Y_m$ represents the alkylene group for the $m^{th}$ cyclic lactam monomer where $Y_m$ can have from 3 to 13 carbon atoms, x is an integer greater than or equal to one and z represents the overall number average degree of polymerization of the entire polyamide block; the remaining nomenclature is the same as previously defined. Again, the polyamide block terminus may vary if chain stoppers (e.g. aniline) are used during the copolymerization.

If an α,ω-difunctionalcopolyorganosiloxane and multiple cyclic lactams are copolymerized then the structure appears as:

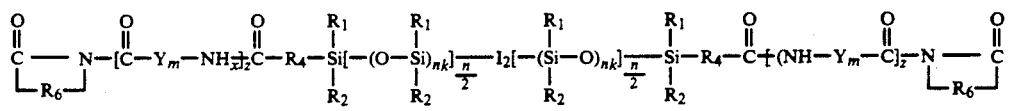

with the same nomenclature as for the diblock copolorganosiloxanecopooyamide.

Process

The cyclic lactam to be copolymerized is first dried by distilling over 5-10 wt % of the charge; additional cyclic lactam monomers are distilled in separate flask and condenser apparatus and then transferred in the appropriate amounts via hot gas-tight syringes or canulas to the copolymerization reactor. The catalyst is prepared simultaneously as described below. Copolymerizations are agitated via either 1) mechanical stirring with an air motor/paddle in an 100 mL flask or a magnetic spin bar in a 1 inch diameter, 6 inch long test tube or 2) an ultrasonic dispersion horn adapted to a known, specially fabricated reactor consisting of an approximately 2 cm diameter cylinder approximately 7 cm long sealed on the bottom with three 6 mm side ports fitted with rubber septa for maintaining an inert atmosphere. The ultrasonic dispersion horn is preferred over mechanical stirring at mixing the polyorganosiloxane macroinitiator with the cyclic lactam(s) prior to catalyst addition. Reactor temperature is maintained between 150° and 180° C. by an external silicone oil bath with a proportional temperature controller.

For low to moderate polyorganosiloxane molecular weights, the macroinitiator is added to the copolymerization reactor via syringe or canula after distillation (and transfer if necessary) of the cyclic lactam(s). For high polyorganosiloxane molecular weights that are highly viscous, the macroinitiator is added to the copolymerization reactor before distillation of the cyclic lactam. If multiple cyclic lactams are used, then the remaining cyclic lactams are distilled in separate flasks and transferred to the copolymerization reactor in the appropriate amounts via hot gas-tight syringes or canula lines. It makes no difference in the order of addition of the dry cyclic lactams and the functionalized polyorganosiloxane since the latter is chemically inert to the lactams at temperatures of 150°-180° C. Also it makes no difference which cyclic lactam is distilled with the high molecular weight polyorganosiloxane macroinitiator but for convenience, it should be the lactam in the greatest relative amount and/or the lactam that does not require vacuum distillation at temperatures exceeding 150°-180° C. Then, the catalyst solution is syringed hot into the reactor flask such that a catalyst/initiator mole ratio of 0.1-20 with a preferred range of 0.5-2.0 is achieved and copolymerization commences. Within minutes after adding the catalyst solution, the turbid reactor contents become nearly transparent as the polyorganosiloxane micelle size is strongly reduced due to stabilization provided by the growing polyamide block.

After the reactor contents are converted into a whitish solid, the raw polymerizate is dispersed in 2,2,2-trifluoroethanol and slowly precipitated into an excess of tetrahydrofuran two times to extract unreacted polyorganosiloxane, catalyst and cyclic polyamide oligomers. Polyamide block molecular weight is determined by $^1$H NMR in deuterated 1,1,1,3,3,3-hexafluoroisopropanol, $^{13}$C solid state NMR and size exclusion chromatography in 2,2,2-trifluoroethanol; the polyamide block molecular weight can vary from about 2-3 kg/mole to as high as 120 kg/mole via this process although useful polyamide block molecular weights are at least about 15-20 kg/mole.

Coordinating Catalyst

Process

The catalyst of this invention may be produced from the reaction of one mole of LiAlH$_4$ with one, two or three moles of an alkyl alcohol or an aryl alcohol such as methanol, ethanol, tert-butyl alcohol, phenol, toluol etc. at 25° C. in anhydrous diethyl ether with vigorous stirring. After degassing, the LiAl(OR)$_j$H$_{4-j}$ (where j=1, 2, or 3 and R is alkyl with 1 to 18 carbon atoms or aryl) in diethyl ether is added to dried, liquid lactam to give a concentration of 0.2-1.0 g-mole catalyst/1000 mL of lactam. It is preferred to use the same lactam for the catalyst reagent as will be polymerized into the polyamide block; for multiple lactams, the smallest ring size is preferred. The volatile ether is distilled off and the catalyst/lactam solution is then transferred hot to the polymerization reactor via gas-tight syringe or transfer line as described above. Alternately, the catalyst solution in diethyl ether can be added directly to the copolymerization reactor containing either the dry lactam(s) or the dry lactam(s) and the (N-acyllactam)-polyorganosiloxane macroinitiator followed by removal of the ether by vacuum distillation.

Catalyst Performance Comparison

To demonstrate the effectiveness of the catalysts of this invention in protecting the polyorganosiloxane during growth of the polyamide block at temperatures of 150°-180° C., a series of LiAl(OtC$_4$H$_9$)$_j$H$_{4-j}$ (j=1, 2, and 3) catalysts in accordance with the invention were prepared. The superior performance of one of the catalysts, LiAl(OtC$_4$H$_9$)$_2$H$_2$, in comparison with conventional lithium caprolactam (J. D. Gabbert, et.al., supra.) and LiAlH$_4$ (M. J. Owen, et.al., supra. and P. M. Lefebvre, et.al., supra.) can be seen by comparing the size exclusion chromatograms of a α,ω-di-(trimethylsiloxy)-polydimethylsiloxane dispersed in ε-caprolactam before and after exposure to the three different catalysts. By using an unfunctionalized polydimethylsiloxane (i.e. one that does not contain an ω-N-acyllactam group) no polymerization of the ε-caprolactam will occur at these temperatures which facilitates size exclusion chromatography analysis of the polydimethylsiloxane.

For lithium caprolactam, a broad dispersity (peak molecular weight=15.5 kg/mole) $\alpha,\omega$-di-(trimethylsiloxy)polydimethylsiloxane was stirred in threefold excess $\epsilon$-caprolactam and 0.03M lithium caprolactam at 90° C. for 65 minutes and sampled by size exclusion chromatography. The results are shown in FIG. 1 where it can be seen that the original polydimethylsiloxane, represented by the short dashed curve, has been depolymerized slightly and that about 10 wt. % cyclics have been generated as indicated by the dash-dot curve. After 20 hours of exposure at 90° C., the polydimethysiloxane composition consisted of about 75 wt. % linear polymer and 25 wt. % dimethylcyclosiloxane.

However, when the experiment was repeated with fresh $\alpha,\omega$-di-(trimethylsiloxy)polydimethysiloxane exposed for 65 minutes at 170° C. under the same stoichiometric conditions, the results were very different as indicated by the solid curve in FIG. 1. Now the size exclusion chromatogram consists of mostly cyclics hexamethylcyclotrisiloxane and octamethylcyclotetrasiloxane with only a small amount remaining as linear polydimethylsiloxane. This experiment dramaticaly demonstrates the deterioration of the polydimethylsiloxane at higher temperatures under the action of lithium caprolactam and why overcoming this depolymerization is an object of this invention.

Figure 2:
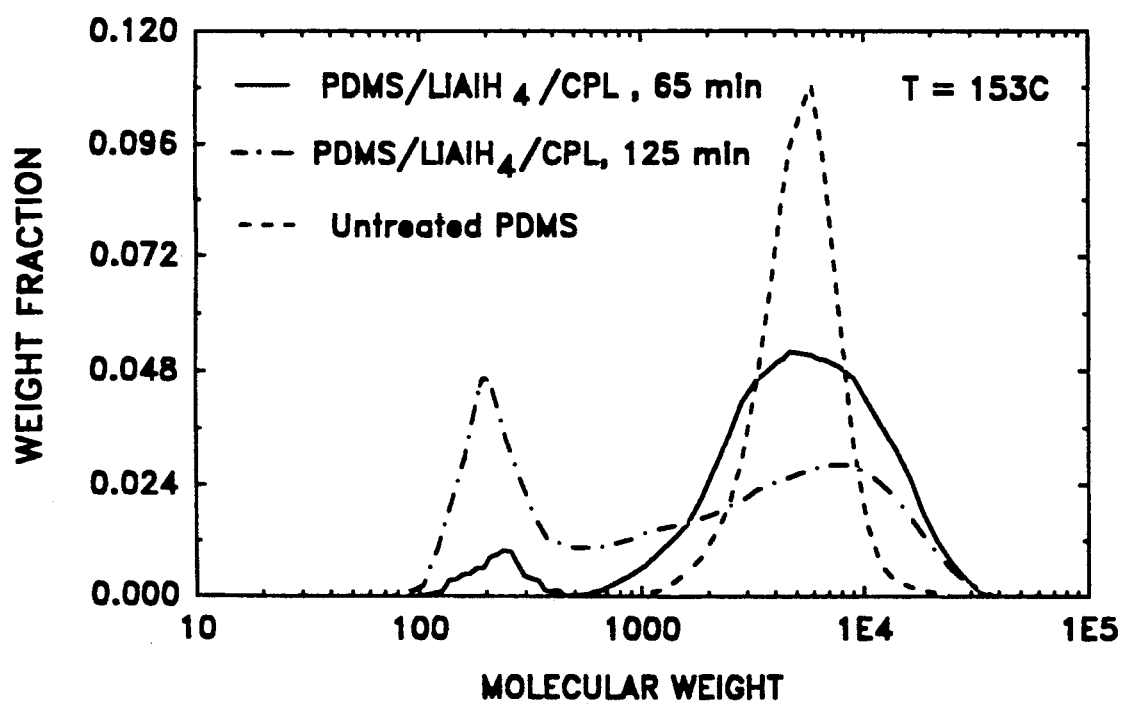
FIG. 2 shows the size exclusion chromatograms of unfunctionalized polydimethylsiloxane before and after 65 minutes and 125 minutes exposure in ε-caprolactam to lithiumaluminumhydride at 153° C.

For performance comparisons of conventional LiAlH$_4$ and the LiAl(OtC$_4$H$_9$)$_2$H$_2$ of this invention, a nearly monodisperse $\alpha,\omega$-di-(trimethylsiloxy)polydimethylsiloxane was used. This polydimethylsiloxane was added to $\epsilon$-caprolactam and stirred with LiAlH$_4$ at 153° C. for a total of 125 minutes. After 65 minutes exposure and 125 minutes exposure, the molecular weight distributions of the $\alpha,\omega$-di-(trimethylsiloxy)polydimethylsiloxane were analyzed by size exclusion chromatography and the results are shown in FIG. 2. These data show that LiAlH$_4$ after just one hour has increased the polydimethylsiloxane polydispersity from 1.2 to 1.8 and generated approximately 10 wt. % cyclic oligomers. After about two hours, the molecular weight varied continuously from a value greater than any chain length present initially all the way down to the cyclic oligomers with a preponderance of the hexamethylcyclotrisiloxane, the starting monomer.

Figure 3:
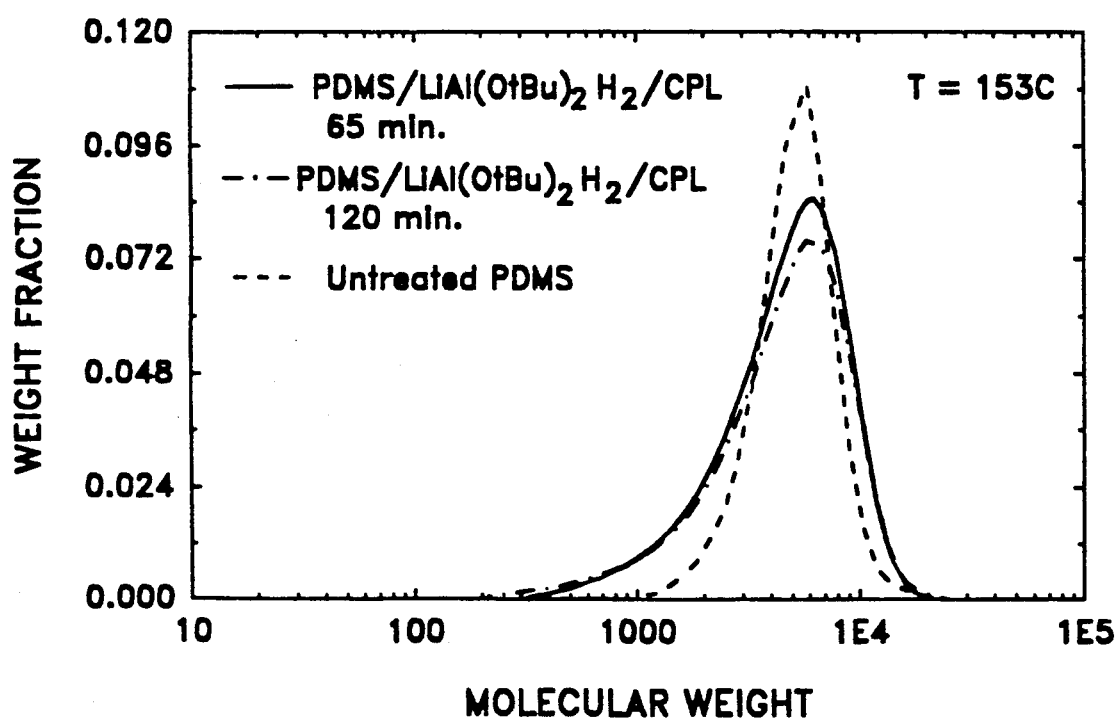
FIG. 3 shows the size exclusion chromatograms of unfunctionalized polydimethylsiloxane before and after 65 minutes and 125 minutes exposure in ε-caprolactam to di-(tertbutoxy)lithiumaluminumhydride of this invention at 153° C.; (note that tBu=tC$_4$H$_9$, PDMS=polydimethylsiloxane, CPL=ε-caprolactam).

When the experiment was repeated using the inventive LiAl(OtC$_4$H$_9$)$_2$H$_2$ catalyst, only a slight broadening in polydispersity (from $\overline{M}_w/\overline{M}_n$=1.2 to 1.45) was advantageously achieved as shown in FIG. 3 for both 65 and 125 minutes exposure time and the peak molecular weight remained approximately constant. Note that all experiments represented by the data in FIGS. 1, 2 and 3 used stoichiometry consistent with that for actual copolymerizations. Similar results were seen for LiAl(OtC$_4$H$_9$)H$_3$ and its effect on polydimethylsiloxane as well as polydiethylsiloxane. Also, the new mono- and di-(tert-butoxy)lithiumaluminumhydride catalysts completely suppressed oligomer dimethylcyclosiloxane formation and minimized polydimethylsiloxane rearrangement, such that the molecular weight of the polydimethylsiloxane remained constant. This is opposed to the severe reduction in molecular weight and subsequent cyclization caused by LiAlH$_4$, lithium caprolactam and other more destructive catalysts such as sodium caprolactam, magnesiumbromide caprolactam, etc.

To quantify the superior performance of the catalysts of the invention, two separate copolymerizations of $\omega$-(N-acyllactam)polydimethylsiloxane and $\epsilon$-caprolactam were conducted using lithium caprolactam and di-(tert-butoxy)lithiumaluminumhydride. After identical workup, $^1$H NMR and size exclusion chromatography were used to calculate the yield of polydimethylsiloxane macroinitiator incorporated into copolymer. With conventional lithium caprolactam catalyst, only 10% of the starting polydimethylsiloxane was coupled to a polyamide-6 block and the polydimethylsiloxane block molecular weight was reduced from 15 kg/mole to 3 kg/mole. The dimethylsiloxane that was not incorporated into the polydimethylsiloxane-b-polyamide-6 copolymer was determined by size exclusion chromatography to have been converted to primarily hexamethylcyclotrisiloxane and octamethylcyclotetrasiloxane.

In contrast, with LiAl(OtC$_4$H$_9$)$_2$H$_2$ catalyst of this invention, 60% of the initial polydimethylsiloxane charged was incorporated into the diblock polydimethylsiloxane-b-polyamide-6 and the polydimethylsiloxane block molecular weight remained constant at 15 kg/mole. The polydimethylsiloxane that was not incorporated into the diblock copolymer was broadened in polydispersity from 1.2 to 1.6 but its peak molecular weight remained constant; the unreacted polydimethylsiloxane was free of any dimethylcyclosiloxanes in exact agreement with the data from the exposure tests of FIG. 3.

EXAMPLE 1

Preparation of Coupling Agent

To a clean, flamed and argon purged flask fitted with a thermometer, magnetic stirrer and dropping funnel, 200 mL of anhydrous diethyl ether was added. Then, 25 g (0.221 gmole) of dried $\epsilon$-caprolactam was added and the mixture stirred to dissolve the $\epsilon$-caprolactam. Approximately 18.0 g (18.3 mL) of pyridine (0.228 gmole) was added and the flask was put in an ice/water bath maintained at approximately 15° C. which was roughly the solubility limit of the caprolactam in the ether. Then, 44.75 g (0.221 gmole) of 10-undecenoyl chloride was added dropwise with vigorous stirring. After the acid chloride was added, the reaction products were stirred an additional hour, then filtered to remove the pyridinium chloride salts. The liquid reaction product in ether was then extracted two times with equivolumes of distilled water, dried over anhydrous MgSO$_4$, filtered and the ether was distilled away leaving an oily, yellowish orange residue which was characterized by gas chromatography and $^1$H NMR.

The 10-undecenoyl-N-caprolactam was then hydrosilylated to dimethylchlorosilane in freshly distilled tetrahydrofuran using hydrochloroplatinic acid, H$_2$PtCl$_6$ catalyst. To a clean, purged 300 mL flask with a rubber septum, magnetic stirrer and thermometer, 25 g (89.6 mmoles) of 10-undecenoyl-N-caprolactam, 150 mL of distilled tetrahydrofuran and 0.018 mmole (9.3 mg) of H$_2$PtCl$_6$·6H$_2$O were added. Then, 12.7 g (14.6 mL, 134.4 mmoles) of dimethylchlorosilane was added dropwise via gas-tight syringe as the temperature was maintained at 30°–50° C. throughout the reaction. The reaction was exothermic and rapid but the flask was stirred overnight to ensure complete hydrosilylation. The product, N-(11-(dimethylchlorosilyl)undecanoyl)-caprolactam was obtained by distillation of the excess silane and tetrahydrofuran and was kept in an air-tight ampoule until use.

EXAMPLE 2

Preparation of Monofunctional Polyorganosiloxane Macroinitiator

To a clean, flamed and purged 200 mL flask equipped with a magnetic stirrer and rubber septum, 35 g (0.157 gmole) of freshly distilled hexamethylcyclotrisiloxane was added followed by vacuum distillation of 75 mL of tetrahydrofuran into the flask. After dissolution of the hexamethylcyclotrisiloxane at 25° C., 2.33 mmole of 1.0M n-butyllithium in hexane (2.33 mL) was added to give a target molecular weight of 15 kg/mole. After initiation had finished and polymerization had commenced, 3 mole % of 1.22 g (1.27 mL) of tetramethyltetravinylcyclotetrasiloxane was added via syringe. After about 2 hours, the siloxane polymerization was terminated by the addition of the coupling agent, N-(11-(dimethylchlorosilyl)undecanoyl)caprolactam. Whitish salts visually confirmed functionalization which was subsequently verified by size exclusion chromatography with a refractive index detector and an ultraviolet absorbance detector set at 225 nm and by $^1$H NMR for molecular weights of about 15 kg/mole and less.

EXAMPLE 3

Preparation of Diblock Copolymer with Ultrasonics

To a clean, flamed and argon purged Suslick cell with three 6-mm side ports capped with silicone rubber septa, 2.0 g (0.133 mmole) of an $\omega$-(N-acyllactam)-polydimethylsiloxane of number average molecular weight 15 kg/mole was added via gas-tight syringe. To this, 8.0 g (70.73 mmole) of previously distilled $\epsilon$-caprolactam was added hot via gas-tight syringe. This mixture was heated to 155° C. by an external oil bath.

Simultaneously, fresh LiAl(OtC$_4$H$_9$)$_2$H$_2$ in excess $\epsilon$-caprolactam was prepared. To a clean, flamed and argon purged six inch test tube capped with a silicone rubber septum at 20° C., 10.0 mL of 1.0M (1.0 gmole/L) LiAlH$_4$ in anhydrous diethyl ether was added via gas-tight syringe. A manometer line and vacuum/argon line with liquid nitrogen cold trap were hooked to the test tube via the rubber septum. To the LiAlH$_4$ in diethyl ether, 20.0 mmole (1.48 g, 1.9 mL) of freshly distilled tert-butyl alcohol was added dropwise via gas-tight syringe and the pressure was maintained at 2-3 cm Hg vacuum until all the required tert-butyl alcohol was added. The mixture was degassed twice by reducing the pressure until foaming occured followed by padding the test tube with thoroughly dried (via phosphorous pentoxide) and deoxygenated (via catalyst train) argon gas.

A separate clean, flamed and purged test tube fitted with a rubber septum was placed in an oil bath at 110° C. This test tube was fitted with the manometer line and vacuum/argon line. To this second test tube, 10 mL of distilled $\epsilon$-caprolactam was added via hot gas-tight syringe followed by dropwise addition of 6 mL (ca. 5 mmole) of the LiAl(OtC$_4$H$_9$)$_2$H$_2$ in diethyl ether (ca. 0.84M); the ether was allowed to boil off as fast as it was added by maintaining a slight vacuum (2-3 cm Hg vac) at all times. When the addition was complete, the 0.5M LiAl(OtC$_4$H$_9$)$_2$H$_2$/$\epsilon$-caprolactam solution was degassed several times as above.

To achieve a 1.0 catalyst/macroinitiator mole ratio, 0.266 mL of 0.5M LiAl(OtC$_4$H$_9$)$_2$H$_2$/$\epsilon$-caprolactam catalyst solution was then added to the Suslick cell copolymerization reactor via hot gas-tight syringe. Ultrasonic dispersion energy to the $\frac{1}{4}$ inch horn tip was maintained at 75 watts. After several minutes the reaction contents became nearly transparent and copolymerization was underway.

After 4 hours, the raw polymerizate was removed from the reactor and worked up by solvent/nonsolvent precipitation two times using a 2,2,2-trifluoroethanol/tetrahydrofuran system. This procedure yielded 4.5 g of a polydimethylsiloxane-b-polyamide-6 diblock copolymer with 15 kg/mole polydimethylsiloxane block number average molecular weight and 45 kg/mole polyamide-6 block molecular weight. Through transmission electron microscopy, the polydimethylsiloxane was seen to be micellized into uniform, 25 nm spherical domains within a matrix of polyamide-6.

The average mechanical tensile properties of this diblock copolymer (Diblock-1) are summarized in Table 1. Note that two types of homopolyamide-6 have been tested in analogous fashion for reference. The diblock shows a reduction in yield and tensile stresses (and flow stress as well) and an increase in elongation to fracture of about 300% thereby increasing the toughness by roughly 100% over that of homopolyamide-6.

EXAMPLE 4

Preparation of Diblock Copolymer without Ultrasonics

To a clean, flamed and purged 6 inch test tube fitted with a silicone rubber septum, 0.5 g of $\omega$-(N-acyllactam)polydimethyl-co-vinylmethylsiloxane of 5 kg/mole molecular weight containing approximately 10 mole % of vinylmethylsiloxy repeat units was added via gas-tight syringe. To this, 10 g of previously distilled $\epsilon$-caprolactam was added via hot gas-tight syringe. The mixture was agitated vigorously by magnetic stirrer and spin bar and heated to 170° C.

The catalyst solution was prepared by adding 10.0 mmole (0.74 g, 0.95 mL) tert-butyl alcohol dropwise to 10.0 mmole of 1.0M LiAlH$_4$ in diethyl ether in a separate clean, flamed and purged test tube which was equipped with a rubber septum and the manometer/vacuum line. The solution was degassed and 5.6 mL of this LiAl(OtC$_4$H$_9$)H$_3$ in diethyl ether solution (0.9M) was added to 10.0 mL of dried $\epsilon$-caprolactam in a separate clean, flamed and purged test tube; the catalyst solution was degassed twice and then 0.2 mL of LiAl(OtC$_4$H$_9$)H$_3$ in $\epsilon$-caprolactam was added via hot gas-tight syringe to the copolymerization reactor which already contained the $\omega$-(N-acyllactam)polydimethyl-co-methylvinylsiloxane and $\epsilon$-caprolactam at 170° C. Copolymerization was complete in about 4 hours and the polyamide-6 block molecular weight was determined to be 100 kg/mole by size exclusion chromatography, $^1$H NMR and $^{13}$C solid state DP/MAS/DD NMR and polysiloxane block molecular weight remained at about 5 kg/mole. This was named Diblock-2 and its properties are shown in Table 1. Thus, with only 5% by weight of polydimethyl-co-methylvinylsiloxane rubber in a diblock copolymer with polyamide-6 and no subsequent reaction of the vinyl groups, the elongation has more than doubled and toughness increased 60% versus homopolyamide-6.

EXAMPLE 5

Preparation of $\alpha,\omega$-Difunctional Polydimethyl-b-methylvinylsiloxane Initiator solution was prepared by adding 228.2 mg of dilithiodiphenyldisilanolate to 10 mL of distilled dimethylsulfoxide in a 25 mL flask equipped with a thermometer, magnetic spin bar and rubber septum. This was stirred at 80° C. for 24 hours to dissolve the lithium disilanolate.

To a clean, flamed and purged 200 mL flask equipped with a magnetic stirrer and rubber septum, 35 g (0.157 gmole) of freshly distilled hexamethylcyclotrisiloxane was added via canula followed by vacuum distillation of 75 mL of tetrahydrofuran into the flask. After dissolution of the hexamethylcyclotrisiloxane at 25° C., 0.872 mmole (8.7 mL) of 0.1M dilithiodiphenyldisilanolate in dimethylsulfoxide was added to the hexamethylcyclotrisiloxane and tetrahydrofuran to give a target polydimethylsiloxane block molecular weight of 40 kg/mole. After about 4.3 hours, 58.0 mmoles (20.0 g, 20.1 mL) of tetramethyltetravinylcyclotetrasiloxane was added to give two outer methylvinylsiloxane blocks of about 10 kg/mole number average block molecular weight each. Polymerization was terminated 3 hours later by the addition of 0.66 mL (1.83 mmole) N-(11-(dimethylchlorosilyl)undecanoyl)caprolactam and the copolyorganosiloxane macroinitiator was worked up as described.

EXAMPLE 6

Preparation of Polyamide-Polyorganosiloxane-Polyamide Triblock Copolymer

To a clean and flamed 3-neck, 100 mL flask specially modified with 4 baffles fitted with a silicone rubber septum, an air motor and paddle stirrer and a distillation head equipped with graduated receiver flask and connected to the vacuum/argon manifold, 5 g of $\alpha,\omega$-di-(N-acyllactam)polymethylvinyl-b-dimethyl-b-methylvinylsiloxane triblock of overall 60 kg/mole number average molecular weight containing approximately 30 mole % of vinylmethylsiloxy repeat units was added. To this, 20 g of as received $\epsilon$-caprolactam was added and the flask apparatus was heated via the external oil bath to about 110° to 125° C. under vacuum and about 5 mL of $\epsilon$-caprolactam was distilled into the graduated receiver flask.

Subsequently, the reactor was heated to about 160° C. and a solution of $LiAl(OtC_4H_9)_2H_2$ in dry $\epsilon$-caprolactam (0.5M) was prepared as outlined in Example 3. Approximately 0.33 mL of this catalyst solution was injected into the copolymerization reactor (catalyst:initiator=1) via hot gas-tight syringe to catalyze the copolymerization which was complete in about 3 hours. This yielded about 9 g of copolymer with a polyamide-6 number average block molecular weight of 59 kg/mole as determined by size exclusion chromatography and $^1$H NMR and the polyorganosiloxane block molecular weight remained at about 60 kg/mole.

EXAMPLE 7

Preparation of Star $\omega$-(N-Acyllactam)-Polydimethylsiloxane

The polyanionic initiator is produced by the reaction of dilute p-divinylbenzene and n-butyllithium in benzene to form micro-particles carrying multiple lithium carbanion sites. Benzene is purified by contact with sulfuric acid in a separatory funnel followed by decantation of the acid. The benzene is neutralized by contact with aqueous $Na_2CO_3$ followed by several washings with equivolumes of distilled water. The wet benzene is then stirred over anhydrous $MgSO_4$ overnight, filtered and then stirred with sodium-paraffin dispersion for 2 days. Then, the benzene is vacuum distilled into a clean, flamed and purged flask with a rubber septum inlet and n-butyllithium is added. The solution is stirred for several hours.

Simultaneously, the p-divinylbenzene is distilled from dibutylmagnesium into a clean, flamed and purged valved burette and then diluted by vacuum distillation of 2 times its volume of dry benzene from the stock benzene with n-butyllithium. Next, a clean, flamed and purged, 3-neck, 300 mL reactor flask is fitted with a magnetic stirrer and rubber septum separated from the flask by an in-line, straight-through-bore teflon valve. The burette containing the p-divinylbenzene and benzene is padded with dry argon from the vacuum/argon manifold, the valve is closed and the burette is transferred to the 300 mL reactor flask which is subsequently evacuated and filled with argon several times. Then, about 100 mL benzene is distilled into the reactor flask from the stock benzene/n-butyllithium solution. To the dry benzene in the reactor flask, 0.5 mmoles (0.5 mL of 1.0M solution) of n-butyllithium in hexane is added via gas-tight syringe through the rubber septum and straight-bore valve. After stirring, the reactor flask is cooled to $-40°$ C. and 0.32 mL of the p-divinylbenzene/benzene solution is added dropwise from the burette to give a ratio of p-divinylbenzene to $Li^+$ of 1.5 which produces the micro-particle with the living lithium carbanion initiation sites as indicated by the red-orange color.

To this suspension of living lithium organic microparticles, 33.7 mmoles (7.5 g) of previously distilled hexamethylcyclotrisiloxane is added via canula through the straight bore valve and rubber septum. The red color, indicative of the living lithium carbanion sites, fades as the sites initiate the polymerization of the hexamethylcyclotrisiloxane and begin to grow the arms of the star-polydimethylsiloxane. However, to get appreciable rates of polymerization of the hexamethylcyclotrisiloxane, about 30 mL of tetrahydrofuran is vacuum distilled into the reactor which is brought to room temperature. The polymerization is terminated approximately 5.5 hours later by the addition of 0.6 mmoles (about 0.22 mL) of N-(11-(dimethylchlorosilyl)undecanoyl)caprolactam.

The arm polydimethylsiloxane number average molecular weight is about 15 kg/mole (target) and the star macroinitiator total arm number average molecular weight will be equal to the average functionality of the core initiators times 15 kg/mole; i.e. for an average functionality of 20, the star $\omega$-(N-acyllactam)polydimethylsiloxane will have a total arm number average molecular weight of 300 kg/mole. The actual star $\omega$-(N-acyllactam)polydimethylsiloxane molecular weight will be greater than 300 kg/mole due to the molecular weight contribution of the core micro-particle. In practice, the star polyorganosiloxane overall molecular weight is determined experimentally by light scattering and viscometry and the core molecular weight and total arm molecular weight are determined simultaneously from the experimental value and the stoichiometry (ratio of p-divinylbenzene to hexamethylcyclotrisiloxane). The functionality then is calculated as the ratio of the total arm molecular weight to the individual arm molecular weight assuming no impurities were present in the reactor.

EXAMPLE 8

Preparation of Star Polydimethylsiloxane-b-Polyamide-6 Copolymer

The LiAl(OtC$_4$H$_9$)$_2$H$_2$ or LiAl(OtC$_4$H$_9$)H$_3$ catalyst is prepared separately as described in Example 3 at a concentration of 0.5M in excess ε-caprolactam.

To a clean, flamed and purged 6 inch test tube fitted with a silicone rubber septum, 2.0 g of star-ω-(N-acyl-lactam)polydimethylsiloxane of 15 kg/mole arm number average molecular weight containing approximately 20 arms per molecule is added. To this, 5 g of previously distilled ε-caprolactam is added via hot gas-tight syringe. The mixture is agitated vigorously by magnetic stirrer and spin bar and heated to 165° C. About 0.27 mL (0.133 mmoles) of LiAl(OtC$_4$H$_9$)$_2$H$_2$/ε-caprolactam solution is added via hot gas-tight syringe and copolymerization commences. After about 4 hours, approximately 3 g of a star-polydimethylsiloxane-b-polyamide-6 is produced containing 20 arms per molecule with each arm consisting of a diblock copolymer with a 15 kg/mole number average molecular weight polydimethylsiloxane block covalently attached to a 38 kg/mole number average molecular weight polyamide-6 block.

TABLE 1

Tensile Properties of Diblocks, Nylon-6 and Blends[+]

| Material | Young's Modulus* E (GPa) | Yield Stress $\sigma_Y$ (MPa) | Tensile Stress $\sigma_B$ (MPa) | Fracture Strain $\epsilon_f$ | Toughness (kJ m$^{-2}$) $\sigma d\epsilon$ | $(\lambda)$[#] |
|---|---|---|---|---|---|---|
| Nylon-6 | | | | | | |
| Allied | 2.80 | 81.2 | 76.0 | .71 | 312 | |
| Monsanto | 2.52 | 80.6 | 78.1 | .57 | 260 | |
| Polydimethylsiloxane-b-Nylon-6 Diblocks | | | | | | |
| Diblock-1 | 1.52 | 46.3 | 46.9 | 2.07 | 592 | 2.13 |
| Diblock-2 | 1.53 | 45.6 | 44.9 | 1.69 | 459 | |
| Binary Blend: Diblock-2/Nylon-6 % w/% w | | | | | | |
| 43/57 | 1.92 | 56.7 | 56.2 | 1.24 | 418 | 1.8 |
| Binary Blend: Nylon-6/Polydimethylsiloxane % w/% w | | | | | | |
| 97/3,250 | .67 | 19.8 | 19.8 | .21 | 20 | |

Footnotes for Table 1:
[+]All samples melt recrystallized and dry at ca. 2000 ppm water; Allied = Capron ® hydrolytic nylon-6, $M_w$ = 59.6 kg/mole, $M_n$ = 31.7 kg/mole; Monsanto = anionic RIM nylon-6, as received $M_w$ = 49.0 kg/mole, $M_n$ = 26.7 kg/mole; Diblock-1: PDMS block $M_n$ = 15 kg/mole; Nylon-6 block $M_n$ = 45 kg/mole; Diblock-2 PDMS-PMVS block $M_n$ = 5 kg/mole; Nylon-6 block $M_n$ = 100 kg/mole; $\dot{\epsilon}$ = 1.3 × 10$^{-3}$ sec$^{-1}$.
*corrected for effective gauge length = 3.0 × actual gauge length; $E_{corr}$ = 3.0 × $E_{act}$
[#]$\lambda$ = natural draw ratio

What I claim is:

1. A process for preparing a block copolymer having a polyorganosiloxane block [B] having a number average molecular weight of about 10 kg/mole to about 150 kg/mole of the formula:

$$\sum_{k=1}^{p} \left[ \begin{array}{c} R_1 \\ | \\ -(Si-O)_{n_k}- \\ | \\ R_2 \end{array} \right]_k \quad [B]$$

and a polyamide block [A] having a number average molecular weight of about 15 kg/mole to about 130 kg/mole of the formula:

$$+(NH-Y_m-\overset{O}{\overset{\|}{C}})_x\frac{1}{z} \quad [A]$$

wherein R$_1$ and R$_2$ are the same or different within each organosiloxane block and wherein R$_1$ and R$_2$ may vary among the p different organosiloxane blocks and are independently selected from the group consisting of alkyl having from 1 to 18 carbon atoms, aryl, alkenyl having from 1 to 12 carbon atoms and combinations thereof, n$_k$ is the number average degree of polymerization of the organosiloxane block and is from about 3 to 7000, k is an integer from 1 to p, p is the total number of organosiloxane blocks in the polyorganosiloxane block [B] and is an integer greater than or equal to one, n is the overall number average degree of polymerization of the entire polyorganosiloxane block [B] and is an integer of from about 3 to 7000, Y$_m$ is an alkylene having from 3 to 13 carbon atoms, l is the total number of different cyclic lactam monomers in the polyamide block [A] and is an integer greater than or equal to one, m is an integer of from 1 to l, x is an integer greater than or equal to one, and z is the overall polyamide block number average degree of polymerization and is an integer of from about 15 to 1200;

comprising mixing together an N-acyllactam functionalized homo- or copolyorganosiloxane, one or more cyclic lactam monomers of the formula:

$$H-N\underset{\underset{Y_m}{\textstyle\rule{1cm}{0.4pt}}}{\rule{1cm}{0.4pt}}C=O,$$

and a catalyst of the formula:

$$LiAl(OR)_jH_{4-j},$$

wherein j=1, 2 or 3 and R is an alkyl having from 1 to 18 carbon atoms or an aryl to form the block copolymer.

2. A process according to claim 1, wherein j=1 or 2 and R is —tC$_4$H$_9$.

3. A process according to claim 1, wherein said N-acyllactam functionalized polyorganosiloxane is a ω-(N-acyllactam), α,ω-di-(N-acyllactam) or star-ω-(N-acyllactam) functionalized polydimethylsiloxane, polydiethylsiloxane, polymethylphenylsiloxane, polymethylvinylsiloxane, polydimethyl-co-methylvinylsiloxane, polydimethyl-co-methylphenylsiloxane, polydimethyl-co-diphenylsiloxane, polymethylphenyl-co-methylvinylsiloxane, or polydimethyl-co-methylphenyl-co-methylvinylsiloxane.

4. A process according to claim 1, wherein said cyclic lactam is epsilon caprolactam, valerolactam, lauryllactam, capryllactam, 2-pyrrolidone or 2-piperidone.

5. A process according to claim 1, wherein said catalyst is separately mixed with one or more said cyclic lactams to form a mixture and the mixture is subsequently mixed with the cyclic lactam(s) and said N-acyllactam functionalized polyorganosiloxane.

6. A process according to claim 1, wherein the copolymerization is carried out at an initial temperature of about 150° C. to about 200° C.

7. A process according to claim 1, wherein ultrasonic dispersion energy, magnetic spin bar stirring, mechanical motor and paddle, Kenics mixer or a combination thereof are used to agitate the copolymerization reactor at an initial reaction temperature of about 150° C. to about 200° C.

8. A process according to claim 1, wherein said $R_4$ is a n-$C_{10}H_{20}$ or p-(ethylene)phenylene.

9. A process according to claim 1, wherein said functionalized homo- or copolyorganosiloxane is an ω-(N-acyllactam)homopolyorganosiloxane or an ω-(N-acyllactam)copolyorganosiloxane and is mixed with said one or more cyclic lactam monomers and said catalyst to produce a polyorganosiloxane-polyamide diblock copolymer [B-A] of the formula:

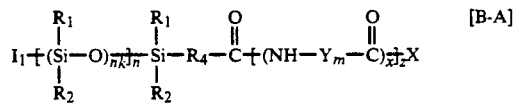

wherein $I_1$ is a polyorganosiloxane initiator moiety of the formula:

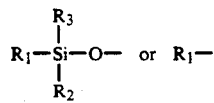

wherein $R_1$, $R_2$ and $R_3$ are the same or different and are independently selected from the group consisting of alkyl having from 1 to 18 carbon atoms, aryl, alkenyl having from 1 to 12 carbon atoms and combinations thereof, $R_4$ is an alkylene having from 2 to 20 carbon atoms, arylene or a combination thereof, and X is the terminal group and is an N-substituted cyclic lactam, N-substituted primary or secondary amine or N-substituted primary or secondary amide.

10. A process according to claim 1, wherein said functionalized homo- or copolyorganosiloxane is an α,ω-di-(N-acyllactam)homopolyorganosiloxane or an α,ω-di-(N-acyllactam)copolyorganosiloxane and is mixed with said one or more cyclic lactam monomers and said catalyst to produce a polyamide-polyorganosiloxane-polyamide triblock copolymer [A-B-A] of the formula:

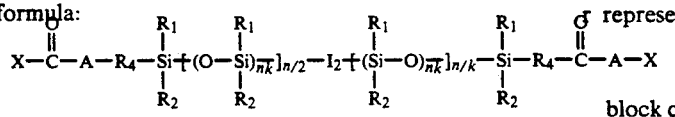

with A=

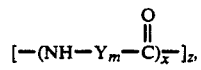

wherein $I_2$ is a difunctional anionic initiator moiety of the general structure:

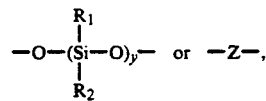

wherein y is an integer greater than or equal to one, $R_1$ and $R_2$ are the same or different and are independently selected from the group consisting of alkyl having from 1 to 18 carbon atoms, aryl, alkenyl having from 1 to 12 carbon atoms and combinations thereof, Z is unsubstituted hydrocarbon or substituted hydrocarbon comprising alkylene, arylene or combinations thereof, $R_4$ is an alkylene having from 2 to 20 carbon atoms, arylene or combinations thereof, and X is the terminal group and is an N-substituted cyclic lactam, N-substituted primary or secondary amine or N-substituted primary or secondary amide.

11. A process according to claim 1, wherein said functionalized homo- or copolyorganosiloxane is a star-shaped ω-(N-acyllactam)homopolyorganosiloxane or a star-shaped ω-(N-acyllactam)copolyorganosiloxane and is mixed with said one or more cyclic lactam monomers and said catalyst to produce a star-polyorganosiloxane-polyamide block copolymer star-$(BA)_r$ of the formula:

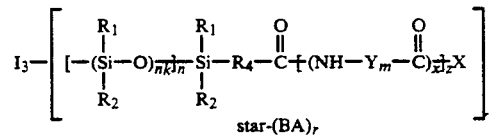

wherein $I_3$ is a polyanionic initiator residue comprising a crosslinked hydrocarbon micro-particle, wherein said hydrocarbon is a combination of alkylene and arlyene or wherein said polyanionic initiator is a residue of the formula:

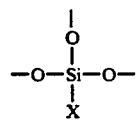

wherein χ is —O— or alkyl having from 1 to 18 carbon atoms, aryl, alkenyl having from 1 to 12 carbon atoms or a combination thereof, $R_4$ is an alkylene having from 2 to 20 carbon atoms, arylene or a combination thereof, X is the terminal group and is an N-substituted cyclic lactam, N-substituted primary or secondary amine or N-substituted primary or secondary amide, and σ represents the average number of arms per star-block copolymer molecule and is an integer greater than or equal to 3.